W. BORLASE.
VARIABLE SPEED GEARING.
APPLICATION FILED JAN. 23, 1909.

966,303.

Patented Aug. 2, 1910.
2 SHEETS—SHEET 1.

Witnesses

Inventor
William Borlase
by B. Singer
Attorney

W. BORLASE.
VARIABLE SPEED GEARING.
APPLICATION FILED JAN. 23, 1909.
966,303.
Patented Aug. 2, 1910.
2 SHEETS—SHEET 2.
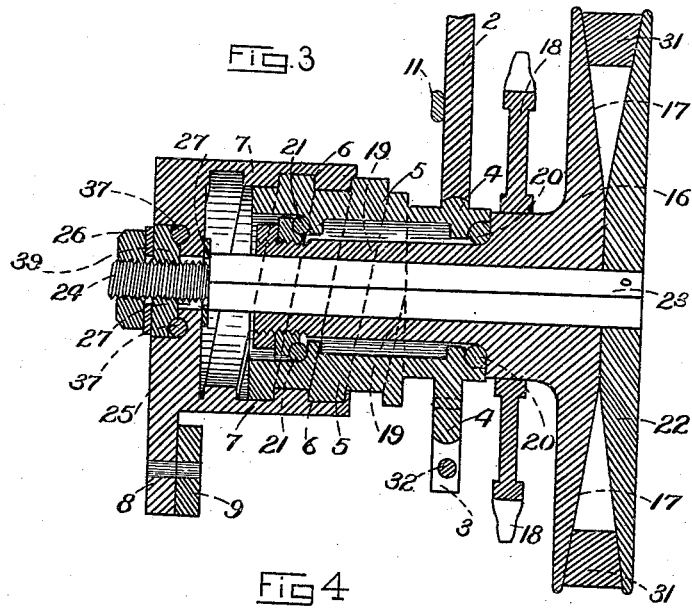
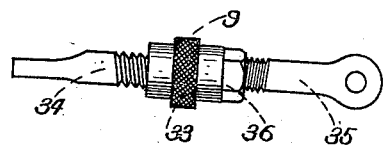
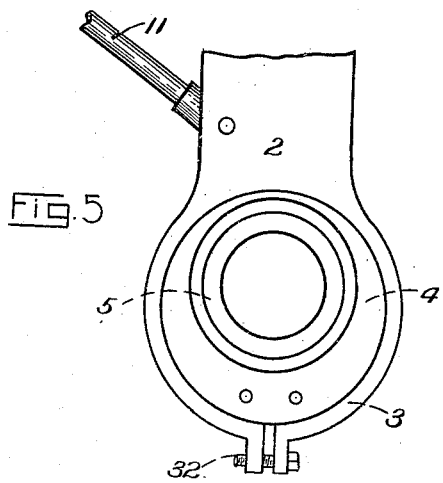
Witnesses
Inventor
William Borlase
by
Attorney

UNITED STATES PATENT OFFICE.

WILLIAM BORLASE, OF DUNEDIN, NEW ZEALAND.

VARIABLE-SPEED GEARING.

966,303. Specification of Letters Patent. Patented Aug. 2, 1910.

Application filed January 23, 1909. Serial No. 473,937.

*To all whom it may concern:*

Be it known that I, WILLIAM BORLASE, subject of Great Britain, residing at Dunedin, New Zealand, have invented new and useful Improvements in Variable-Speed Gearing, of which the following is a specification.

This invention is for an improved variable speed gearing whereby the use of cogs and clutches is dispensed with, and a smoothly operating gearing is provided that can be manipulated during motion to vary the speed to any rate between a maximum and a minimum, the same manipulation also effecting the corresponding necessary adjustment of the driving belt. The invention is therefore specially applicable to motor cycles, motor cars, and the like, and in this specification and the accompanying drawings is described and illustrated as applied to a motor cycle.

Figure 1:
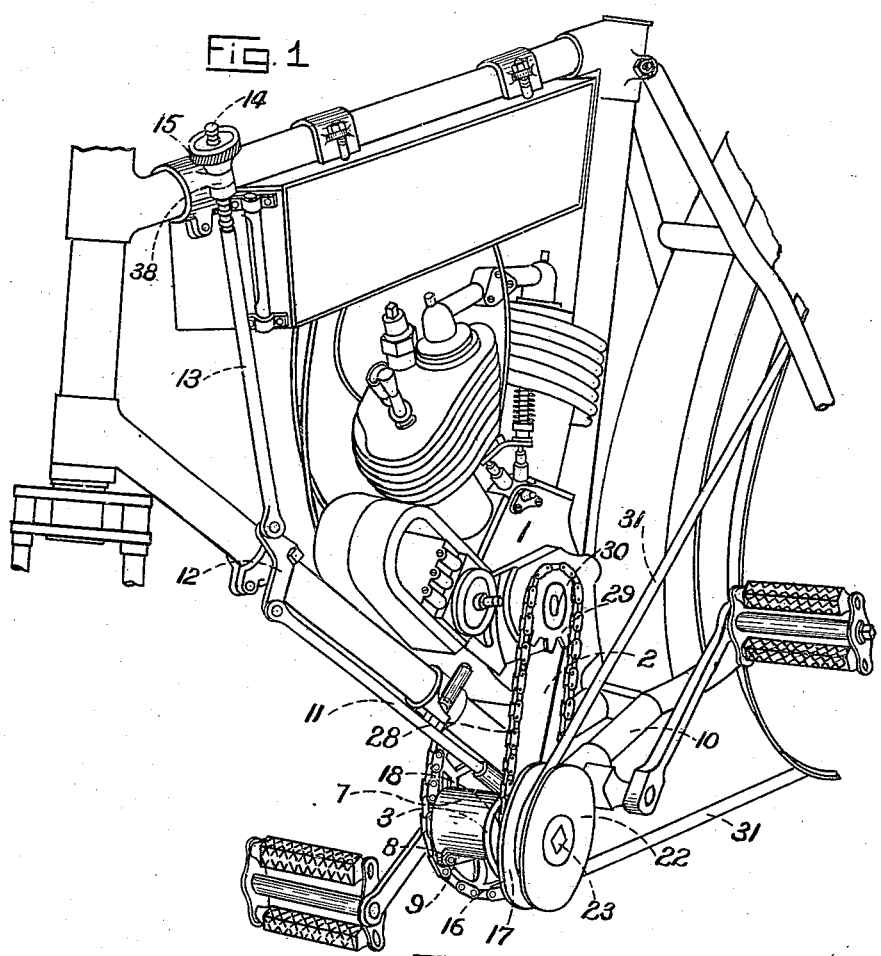
Figure 2:
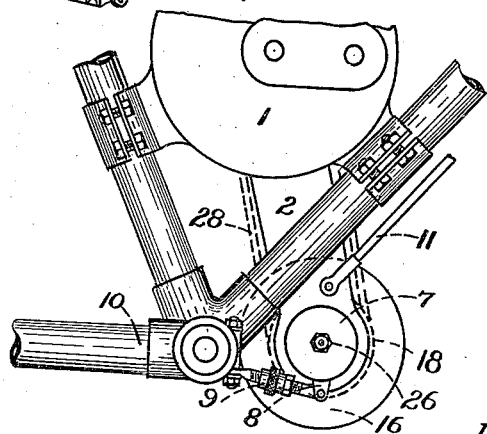

In the accompanying drawings:—Figure 1 is a perspective view of portion of a motor cycle fitted with the invention. Fig. 2 is a side detail view showing the position of the adjusting strap. Fig. 3 is a longitudinal sectional view of the invention. Fig. 4 is a side view of the adjusting strap. Fig. 5 is a view showing the eccentric and the means for tightening the sprocket chain.

Pivotally suspended from the crank case (1) is an arm (2) carrying at its lower end a strap (3) and eccentric (4) see Fig. 5. Secured to the eccentric (4) (see Fig. 3) is a cylindrical portion (5) having a helical screw (6) cut on its external surface on which screw (6) a cap (7) suitably threaded fits and by its rotation is adapted to move off and on the cylindrical portion (5). This cap (7) is supported pivotally by a lug (8) pivoted to an adjusting strap or rod (9) which is secured to the axle bracket or any convenient part of the cycle frame (10). A rod (11) (see Fig. 1) is secured at one end to the suspended arm (2) just above the cylindrical portion (5) the other end of this rod being connected to a bell crank (12) (see Fig. 1) mounted on the lower bar of the cycle frame (10) near the upper end thereof. Another rod (13) extends from this bell crank (12) and has its upper end (14) externally threaded and loosely fitted in a bracket (38) on the top bar of the cycle frame. A milled nut (15) working on the end (14) moves the rod (13) up and permits it to descend as required on being turned.

A disk (16) with a cone shaped surface (17) (see Fig. 3) has a sleeve (19) journaled on ball bearings (20) (21) within the cylindrical portion (5) and has a small sprocket wheel (18) keyed on or secured thereto between the suspended arm (2) and the disk (16). A second disk (22) also with a cone shaped surface is fixed on one end of a squared spindle (23) which passes inside the sleeve (19) of the other disk (16) the two disks (16) and (22) forming an expanding pulley with a V shaped space between them caused by their opposing cone-shaped surfaces. The other end (24) of the spindle (23) passes through the end (25) of the cap (7) working on the cylindrical portion (5), and is threaded to take a lock nut (26) which on being tightened up causes a shoulder (27) near the end (24) of the spindle (23) to engage the inner surface of the cap (7) so that when the cap (7) is rotated on the cylindrical portion (5) the spindle (23) carrying the disk (22) is pushed through the sleeve (19) by means of the shoulder (27) thus causing the disk (22) to move out from the disk (16).

A chain (28) (see Fig. 1) runs around the small sprocket wheel (18) over another sprocket wheel (29) secured to the end of the horizontal shaft (30) driven by the engine. The driving belt (31) is preferably V shaped in cross section and runs between the disks (16) (22) and the usual pulley on the rear wheel of the cycle. The driving belt is made of a length sufficient for the gearing at the maximum speed. To reduce the gear, the milled nut (15) is turned operating the bell crank (12) by means of the rod (13) and thereby the rod (11) which draws the arm (2) forward thus tightening the belt (31), and the cap (7) is simultaneously caused to rotate owing to the adjusting strap (9) holding the lug (8) back. When the cap (7) rotates on the cylindrical portion (5) and forces out the spindle (23) and consequently the disk (22) the belt (31) will descend farther down between the disks (16) (22) and thus reducing the gear. Within the cylindrical portion (5) the sleeve (19) revolves continuously on the ball bearings (20) (21) and the spindle

(23) being square, revolves with it, the end (24) running on ball bearings (37) which are kept in place by the cone (39).

The chain (28) is tightened when required by rotating the eccentric (4) carrying the cylindrical portion (5) (see Fig. 5) in the strap (3) and tightening the screw (32) to keep it in position.

The belt (31) is tightened independently when desired by the adjusting strap (9) (see Fig. 4) which consists of two portions (35) and (34) threaded with a left and right hand thread respectively to enter a knurled nut (33) tapped to receive them so that when the nut (33) is turned one way both portions (34) (35) simultaneously are forced out or drawn into the nut (33). A locking nut (36) is mounted on the part (35) to keep the nut (33) from working loose.

I do not confine myself to the precise construction of parts as shown, as, although the apparatus described is believed to be the simplest to carry out the principle of the invention, numerous variations may be devised, differing in detail but within the principle of the invention.

Having now described my invention, what I claim as new and desire to secure by Letters Patent is:—

1. In variable speed gearing, in combination, an externally threaded cylindrical member a cone shaped disk provided with a sleeve journaled in ball bearings within said member, a cap internally threaded to mesh with said member, and a second cone shaped disk forming with said first disk a pulley, a squared spindle slidably secured to said second disk and disposed within said sleeve and having its free end revoluble in the end of said cap, substantially as described.

2. A variable speed gearing comprising in combination, a frame, a driven shaft mounted in said frame, a sprocket wheel on said shaft, a pivotally mounted arm, an externally threaded cylindrical portion revolubly mounted in said arm, a cone shaped disk provided with a sleeve revolubly mounted in said cylindrical portion, a sprocket wheel on said sleeve, a chain trained about said sprocket wheels, a cap having threads engaging the external threads of said cylindrical portion, a second cone shaped disk forming with said first named disk a pulley, a spindle secured to said second disk and slidably and non-rotatively mounted in said sleeve and having its free end portion revolubly connected with said cap, and means for simultaneously rocking said arm and rotating said cap.

3. A variable speed gearing comprising in combination, a frame, a driven shaft mounted in said frame, a sprocket wheel for said shaft, a pivotally mounted arm, an externally threaded cylindrical portion revolubly mounted in said arm, a cone shaped disk provided with a sleeve revolubly mounted in said cylindrical portion, a sprocket wheel on said sleeve, a chain trained about said sprocket wheels, a cap having internal threads engaging the external threads of said cylindrical portion, a second cone-shaped disk forming with said first named disk a pulley, a spindle secured to said second disk and slidably and non-rotatively mounted in said sleeve, and having its free end revolubly connected with said cap, a connection between said cap and frame, and means for rocking said arm.

4. In a variable speed gearing, in combination, an expansible pulley, a second pulley, a belt trained about said pulleys, means for bodily moving said first named pulley, and mechanism operated by such bodily movement for expanding or contracting said first named pulley.

5. In a variable speed gearing, in combination, an expansible pulley, a second pulley, a belt trained about said pulleys, means for bodily moving said expansible pulley, and mechanism actuated upon such bodily movement for contracting or expanding said first named pulley, said mechanism including two coacting parts, and means for restricting movement of one of said coacting parts.

6. In a variable speed gearing, in combination, an expansible pulley, a second pulley, a belt trained about said pulley, means for bodily moving said expansible pulley, and mechanism operated upon such bodily movement to contract or expand said first named pulley said mechanism including two coacting parts, and adjustable means for restricting movement of one of said coacting parts.

7. In a variable speed gearing, in combination, an expansible pulley, a second pulley, a belt trained about said pulleys, means for bodily moving said expansible pulley, and mechanism actuated upon such bodily movement for expanding or contracting said first named pulley, said mechanism including coacting threaded members, and adjustable means for restricting movement of one of said members.

8. In a variable speed gearing, in combination, an expansible pulley, a second pulley, a belt trained about said pulleys, a chain wheel associated with said expansible pulley, means, including coacting relatively movable threaded members for expanding or contracting said expansible pulley, a device for restraining movement of one of said members, and means for adjusting said device for varying the position of said chain wheel, substantially as and for the purpose set forth.

9. In a variable speed gearing, in combination, rotary devices concentrically disposed with respect to each other and including an expansible pulley and a chain wheel, a member supporting said devices and permitting bodily movement thereof collectively, a second pulley, a belt trained about said pulleys, means for contracting or expanding said expansible pulley and bodily moving said devices for tightening or loosening said belt in accordance with such contraction or expansion, and means connected with said devices for adjusting the position of said chain wheel, substantially as and for the purpose set forth.

10. In a variable speed gearing, in combination, a movably mounted arm, an eccentric rotatively disposed therein, an expansible pulley and a chain wheel carried by said eccentric, a second pulley, a belt trained about said pulleys, means for contracting or expanding said expansible pulley to vary the speed and moving said arm accordingly to maintain said belt taut, and means for revolving said eccentric to change the position of said chain wheel, substantially as and for the purpose set forth.

11. In a variable speed gearing, in combination, a movably mounted arm, an expansible pulley and a chain wheel, a second pulley, a belt trained about said pulleys, means for contracting or expanding said expansible pulley to vary the speed and moving said arm accordingly to maintain said belt taut, and an eccentric carrying said chain wheel and expansible pulley and mounted in said arm and arranged for rotation therein to change the position of said chain wheel, substantially as and for the purpose set forth.

12. In a variable speed gearing, in combination, an expansible pulley, a second pulley, a belt trained about said pulleys, means for expanding or contracting said expansible pulley to change the speed and simultaneously bodily adjusting said expansible pulley to maintain the belt taut, and additional means for tightening said belt.

13. In a variable speed gearing, in combination, an expansible pulley, a second pulley, a belt trained about said pulleys, means for bodily moving said expansible pulley, and mechanism associated with said expansible pulley for contracting or expanding the same comprising a revolubly mounted cylindrical portion provided with external threads, a member in threaded engagement with said cylindrical portion, and means for restricting movement of said member.

In testimony whereof I have signed my name to this specification in the presence of two subscribing witnesses.

WILLIAM BORLASE.

Witnesses:
ANDREW JOHN PARK,
JOHN RUTHERFORD PARK.